(12) United States Patent
Patel et al.

(10) Patent No.: US 7,737,914 B2
(45) Date of Patent: Jun. 15, 2010

(54) INFORMATION SYSTEM

(75) Inventors: Dipak Patel, Ipswich (GB); Robin T Mannings, Ipswich (GB)

(73) Assignee: British Telecommunications public limited company, London (GB)

( * ) Notice: Subject to any disclaimer, the term of this patent is extended or adjusted under 35 U.S.C. 154(b) by 1274 days.

(21) Appl. No.: 10/483,000

(22) PCT Filed: Jul. 23, 2002

(86) PCT No.: PCT/GB02/03373

§ 371 (c)(1),
(2), (4) Date: Jan. 8, 2004

(87) PCT Pub. No.: WO03/013043

PCT Pub. Date: Feb. 13, 2003

(65) Prior Publication Data

US 2004/0179040 A1    Sep. 16, 2004

(30) Foreign Application Priority Data

Aug. 1, 2001  (EP) .................................. 01306614
Jan. 28, 2002  (GB) .................................. 0201912.3

(51) Int. Cl.
  *G09G 5/00* (2006.01)
(52) U.S. Cl. .......................................... 345/2.3; 705/14
(58) Field of Classification Search ............... 345/2, 345/3, 156, 87, 2.3; 705/14, 26, 27
  See application file for complete search history.

(56) References Cited

U.S. PATENT DOCUMENTS

| | | | |
|---|---|---|---|
| 6,587,835 B1 * | 7/2003 | Treyz et al. ............ | 705/14 |
| 2001/0051900 A1 * | 12/2001 | Fisher et al. ............ | 705/26 |
| 2002/0013144 A1 * | 1/2002 | Waters et al. ............ | 455/414 |
| 2002/0046184 A1 * | 4/2002 | Villaret et al. ............ | 705/64 |

(Continued)

FOREIGN PATENT DOCUMENTS

EP    1030272 A2    8/2000

(Continued)

OTHER PUBLICATIONS

Bluetooth Specification, Wireless Connections Made Easy, Version 1.1, vol. 2, Feb. 22, 2001, XP-002313541.

(Continued)

*Primary Examiner*—Amr Awad
*Assistant Examiner*—Stephen G Sherman
(74) *Attorney, Agent, or Firm*—Nixon & Vanderhye P.C.

(57) ABSTRACT

An interactive information delivery terminal includes an information display unit, retrieval client for generating control commands for transmission to an information store over a first communications link, for the retrieval of information therefrom, and a user interface for receiving control commands from a user device over a second communications link for controlling the retrieval client. The terminal is connected to the Internet and a short range radio (piconet) interface, for example a "Bluetooth" interface and is located in a position where it is not vulnerable to damage but where it is nevertheless visible. The radio interface is located so that it can make radio contact with interface units fitted to user handsets in a publicly accessible region. Through the Internet the terminal may be connected to any other internet site.

10 Claims, 1 Drawing Sheet

U.S. PATENT DOCUMENTS

2002/0069165 A1 * 6/2002 O'Neil .................. 705/40

FOREIGN PATENT DOCUMENTS

| WO | WO 98/36552 | 8/1998 |
|---|---|---|
| WO | WO 99/67904 | 12/1999 |
| WO | WO 02/17135 A1 | 1/2002 |

OTHER PUBLICATIONS

Haartsen, The Bluetooth Radio System, IEEE Personal Communications, IEEE Communications Society, US, vol. 7, No. 1, Feb. 2000, pp. 28-36.

Haartsen, "Bluetooth—The Universal Radio Interface for AD Hoc, Wireless Connectivity", On—Ericsson Review, Ericsson, Stockholm, SE, No. 3, 1998, pp. 110-117.

* cited by examiner

INFORMATION SYSTEM

This application is the US national phase of international application PCT/GB02/03373 filed 23 Jul. 2002 which designated the U.S. and claims benefit of EP 01306614.7, dated Aug. 1, 2001 and GB 0201912.3, dated Jan. 28, 2002, the entire content of which is hereby incorporated by reference.

BACKGROUND

1. Technical Field

This invention relates to interactive computer information display systems for displaying text or other information. Such systems are coming into widespread use, through information access systems such as the "Internet" World Wide Web (WWW). Large amounts of information are available to users having access to such systems. However, in order to gain access to such systems relatively expensive hardware is required, in particular a computer and a modem, limiting the availability of the information to users who have access to such a terminal. Furthermore, the hardware is typically bulky, and is not easily portable. Mobile systems, comprising a "laptop" computer and a cellular telephone, do exist, but because of the limited bandwidth available on mobile communications, these tend to be very slow.

2. Related Art

Customer Relationship Management (CRM) is a term used for software, systems, methodologies and capabilities that help an enterprise organise and manage customer relationships. The use of CRM systems and strategies lead to a better understanding of customer wants and needs. Used in conjunction with data warehousing, data mining, call centre systems and other intelligence applications, CRM allows enterprises to gather and access information about customer buying preferences, purchase histories, complaints and other data so to aid the anticipation of what customers will want. Other benefits of CRM for businesses include increased customer loyalty, faster response to customer inquiries, a deeper understanding of customers, increased marketing and selling opportunities, monitoring feedback that leads to improved products and services and obtaining information that can be shared with business partners to create new propositions for customers.

Multimedia "kiosks" have been proposed for locations to which the public have access. In order to identify the user, and allow payment to be made for the service if required, facilities such as a credit card "swipe" unit are also necessary. Nevertheless, however the authentication is done, since such kiosks are available for any member of the public to use, the user has to provide user-specific information if CRM-based information is to be usable by the service provider. For security, this may require the user to have a security password or other access control process, making the use of such systems cumbersome. Some such facilities, for example that disclosed in International patent application WO02/07135, make use of a wireless connection for such authentication, for example using the "Bluetooth" standard to be discussed later, so that a suitably equipped portable device may transmit the necessary identification information to the fixed terminal, thereby permitting the holder of the portable device to operate the fixed device.

However, there is a further drawback to such systems. The fixed equipment is valuable, and its accessibility to the public makes it vulnerable to theft, vandalism, and tampering. The equipment is also not suitable for exposed locations, as it is not in general weatherproof.

International Patent application WO98/36552 discloses a system in which a mobile handset, such as a standard cellular telephone, may be used to control a fixed visual display unit, by setting up a data connection over the cellular telephone network between the cellular telephone and a server controlling the display unit. This allows a mobile user to access data over a high speed link, for display on a large screen terminal close to his current locality, whilst the terminal itself can be protected from theft, vandalism, the weather and other hazards by being located in an inaccessible, but visible, location such as behind a shop window.

However, this system requires the establishment of two separate data links, between the server and the user's mobile terminal and between the server and the fixed terminal. If any audio information is to be supplied, or any private personal data, this cannot be exchanged between the user and the fixed terminal without the use of separate links to the server, requiring greater bandwidth than that needed for a few simple control commands. It should be noted in this connection that, in this specification, the term "display" is not limited to visual displays but, unless the context demands otherwise embraces other means of conveying information such as tactile (e.g. Braille, vibration alerts) and audio information. A terminal sealed behind a shop window is of course inherently unsuitable for conveying such information.

BRIEF SUMMARY

The present invention proposes an alternative arrangement.

According to the invention, there is provided an interactive information delivery terminal comprising an information display unit, retrieval means for generating control commands for transmission to an information store over a first communications link, for the retrieval of information therefrom, and a user interface for receiving control commands over a second communications link for controlling the retrieval means. By transmitting the control commands over the user interface, and not just the authentication information, it is now possible to place the information display unit in a secure position, without the need for the user to make a network connection.

The associated user interface is preferably capable of operation as part of an ad hoc short range wireless interconnectivity system such as the system developed under the Trade Mark "Bluetooth". This system uses radio interfaces in the 2.45 GHz frequency band to allow suitably equipped portable electronic devices to connect and communicate wirelessly via short-range ad hoc networks. This system is designed to replace cables between portable consumer devices such as cellular telephones, headsets, laptop computers, personal digital assistants, digital cameras, and many other products. The Bluetooth system is described in Ericsson Review No 3, 1998, Jaap Haartsen, "BLUETOOTH—The universal radio interface for ad hoc, wireless connectivity". Such networks are referred to in that article, and in this specification, as "piconets". Each unit can simultaneously communicate with several other units. The Bluetooth version 1.0 specification was agreed in July 1999.

Using this invention a user does not even need to actively express an intention to use the system: the mere physical presence of the user's handheld device is sufficient to establish a piconet connection with a nearby terminal. Therefore if the user wishes to use the service, there is no need for any preliminary connection procedure with the fixed terminal. Indeed, the fixed terminal, recognising the presence of the user device when the piconet connection is first established, may display an alert signal to the user to indicate the availability of the service. The alert may be displayed on the fixed terminal or transmitted over the piconet connection to the user device.

BRIEF DESCRIPTION OF THE FIGURE

An embodiment of the invention will now be further described, by way of example only, with reference to the single drawing, in which FIG. 1 shows schematically an interactive information delivery system according to the invention, and the devices it co-operates with.

DETAILED DESCRIPTION OF EXEMPLARY EMBODIMENTS

Figure 1:
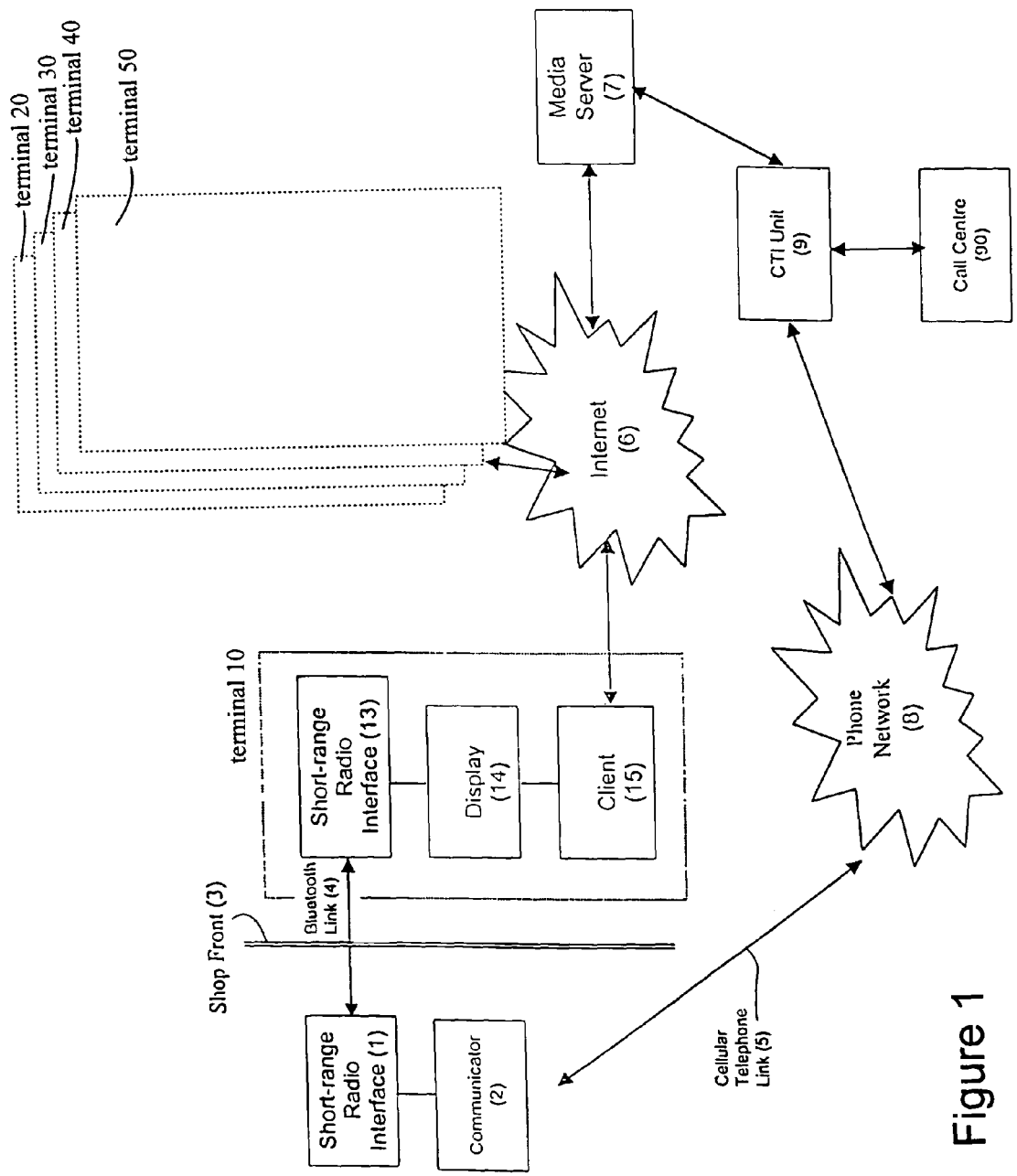

In FIG. 1 a number of interactive information delivery terminals (10, 20, 30, 40, 50 etc) are connected to the Internet (6). Only one terminal 10 is shown in detail. It comprises a display unit (14), a client processor (15) for communicating with other devices through the internet (6), and a short range radio (piconet) interface (13), for example a "Bluetooth" interface. The terminal 10 is located in a position where it is not vulnerable to damage from influences such as the weather, or accidental or malicious damage from members of the public, but where it is nevertheless visible. A typical example would be in a shop window display, visible through and protected by the window (3) itself. The radio interface 13 is located in such a position that it can make radio contact over a connection 4 with interface units (1) fitted to suitably equipped user handsets (2) in the publicly accessible region on the other side of the window (3). Through the internet 6 the terminal 10 (and the other terminals 20, 30, 40, 50) may be connected to any other internet site, and in particular to a media server 7, operating as a client of that server.

Some user handsets 2 may also be capable of connection over a radio connection such as a cellular telephone link 5, and through a telephone network 8, to a computer/telephony integration unit 9 associated with the media server 7. Such a unit is described in the aforementioned International Patent specification WO98/36552. FIG. 1 also shows a call centre 90 associated with the computer/telephony integration unit 9.

The terminal equipment 10 comprises short-range (piconet) radio interface (13); a large colour display (14) such as a plasma screen or a projector; and a standard PC client interface (15). These relatively valuable items could be integrated behind a secure, vandal proof, weatherproof enclosure e.g. a shop window, such that the display can be seen, but not touched, and the interface 13 can communicate with the user's interface unit 1. In use, a user may access the terminal 10 with any portable communicator device (2) having a short-range piconet radio interface (1) operating according to the same system as the piconet interface 13. The user device 2 may take the form of a personal digital assistant (PDA), a mobile phone, a device incorporating a "Bluetooth" chip or the like, or a simple RFID (radio frequency Identification Device) "tag" having only a basic identity code transmittable over a piconet connection.

The terminal 10 is configured to communicate over a broadband link, using the Internet (6), to a media server (7) and/or to other terminals (20). The server (7) is capable of delivering many types of content and streamed multimedia to the terminals.

The main tasks of the server (7) are to serve the content, maintain state and system information for each user and client, personalise and localise content (using software agents) and allow interfaces to other specialised subsystems (e.g. a call centre). The content is essentially dynamic and can reflect specific marketing campaigns the retailer is running or events occurring within the store where the client is situated. The client devices (2) form part of the Responsive Environment: the area where the user sensing and interaction occurs. There are many possible configurations of the Responsive Environment depending on the type of site and other factors such as cost.

The use of this system comprises three basic phases: initiation, interaction, and closure. For initiation, one or more individuals may simply walk into a designated Responsive Environment in proximity of a public multimedia display device (14). This environment comprises one or more devices that can detect an artifact that an individual carries with him. This artifact could be the consumer's loyalty card or mobile communicator device. Bluetooth devices each have a unique identity (MAC address). This identity can be read by the Responsive Environment and used to associate that individual's identity with a data file relating to that user and held by the server 7. By means of the short-range radio interface (1) on the user's communicator device (2), the terminal's short-range radio interface (13) detects the user's presence, and a process of user authentication is then triggered by transmitting a message to the server 7. The server 7 responds by delivering an interactive page or other multimedia to the terminal 10 offering a range of services it has available. An alert may be generated on the user's device by means of a visual signal (e.g., a flashing light), and audio signal (e.g. a distinctive ringing tone), a tactile signal (e.g. vibration of the device), or some combination of such alerts. Alternatively, or in addition the display device 14 may itself generate an alert, for example by displaying a greeting to the user. If the communicator device 2 identifies the individual user, the terminal may retrieve information from the server 7 about that user allowing the greeting to be personalized, thereby allowing the display screen 14 in the shop window to greet passers-by name if they are carrying suitable communicator devices 2.

When initiation is completed the interaction process begins. The individual now has access to the facilities and services available from this client. A simple user interface, which is either controlled through a personal device or a client mechanism, drives a large multimedia display. Using the portable communicator device 2 the user may control the terminal 10 (and therefore the server 7) using the short-range Bluetooth radio technology. The server 7 can provide information relevant to the user's current location because it can identify the current location of the user from the identity of the client terminal 10 through which the user is accessing the data. If a user identity code has been transmitted to the terminal 10 it may be sent to the server (7) over the Internet (6) for the purpose of personalising the content to the user. Content from the server displayed on the display device is therefore personalised, localised and context aware, but content concerning private or sensitive information can be sent directly to the individuals' communicator. A Bluetooth communicator device could therefore be used as a second display/control mechanism, on which private or secure transactions could be carried out on the communicator device. The communicator device audio channel could be used to listen to personalised information or talk to a call centre. The user could drive the main display interface using the interface on the communicator, the Bluetooth link being used to send commands to the Bluetooth enabled client.

To end or suspend the interaction the person simply walks away. The Responsive Environment detects this change and promptly initiates a session closure process.

There are many uses to which the invention may be put. By having a display terminal in a shop window, passers by using their mobile communicator devices could browse and purchase that shop's products and services, even outside the hours that the shop is open in the conventional sense. Since the display is in public view, any audio, personal, or private payment information should only appear on the customers' handheld device, reserving the screen for showcasing high quality broadband content.

People are hesitant to buy non-commodity high value items over the Internet impulsively—they want to test drive cars, try clothes on, taste wines and see works of art before they make a purchase. This means that retailers' physical locations become 'try out' outlets, which are visited by customers to try out the products before spending their money online with a cheaper supplier who does not have to carry the financial overhead of maintaining a showroom or holding stock for display. The invention can be used by the physical retail outlets to manage the customer's experience in the retail premises in a manner that provides a great deal of personalisation, to the benefit not only of the customer, but also of the retailer by both attracting customers into the retail premises, by obtaining information about them.

If the interaction is with a device carried by and already identified with the user, the user can be identified explicitly, the user controlling the display by interaction between the portable device and the display device. The user may do this actively, or it may be done automatically in response to proximity of the devices to each other. However, devices not identifiable with the user may also be used. For example, items in a shop may be tagged with such a device, identifying the item. The personal details of a user carrying such an item may be unknown to the retailer, but his interest in that item can be registered and used to alert customers to other items that might also interest them.

For instance, a record store employing such a system could allow its customers to listen to its products while walking around the store. Consumers could use a communicator device to gain access to a 'personal radio station' that only plays the music they are interested in. Simply by picking up a CD in a responsive environment would stream the music to the customers handset. The customers can listen to all the music they desire, as long as they remain in the store. Even if a customer doesn't buy anything on a particular visit, the retailer gets information about the tastes and preferences of that individual, allowing a greater focus in future marketing and selling opportunities In a clothes shop, a changing room fitted with the invention would be able to suggest other clothes that might suit the user as he or she tries an item, looking into a screen serving as an electronic mirror. A customer loyalty system attached to the retailers website could allow the retailer to upload details of other items in the user's wardrobe purchased from the same retailer, allowing the user to check whether an item being tried complements other items he has previously purchased but does not have with him.

At a supermarket, consumers' lifestyles could be taken in account and actively supported, for example by providing calorific and nutritional values of purchases for those on calorie controlled diets, or personalised shelf edge displays recommending particular combinations of food, wine and recipes depending on what is already in an individual's shopping basket or past shopping lists, or personalised product warnings to users with special dietary needs such as allergies.

A video rental store could offer customers personalised trailers showing the highlights or reviews of films that are of interest to them simply by holding the video cassette cover equipped with a device near a screen.

Provision of this facility may also allow useful tie-ins between businesses, for example allowing finance to be arranged for a large purchase.

Four possible interaction scenarios will be discussed. It will be appreciated that others are possible. The level of interaction facilitated by the system is dependent on what facilities the user has available to him when he arrives at the location of the terminal 10, and in particular the capabilities of his own handset.

1. High-End Interaction.

In the first scenario the user has a PDA style communicator (2) with a display and user interface and integrated piconet short-range radio technology (1). When the user device (1,2) is in proximity of the terminal 10 the interface units 1, 13 automatically establish a piconet connection 4, causing the communicator to display a message and/or vibrate to alert the user that interaction is possible. The display 14 may also respond to the establishment of the connection by displaying a welcome message to the user.

The user may accept this invitation to interact by pressing appropriate keys on his communicator device. The terminal 10 then causes the display (14) to provide feedback to the user, denoting that an interactive session has begun. Since the communicator device has a user interface that is specific to a particular platform (e.g. Palm Computing, Microsoft Pocket PC), the piconet interfaces (1,13) negotiate a set of capabilities and identify the platform. During this negotiation phase a set of usage profiles are determined. Such profiles are defined in the Bluetooth specification and describe various capabilities of devices. For example a headset profile would indicate that the device can send/receive audio only, whilst an FTP profile indicates that the device can send/receive files. These usage profiles allow the terminal to tailor the interaction to the user, as will be described. The FTP profile is required to download the client control program for the communicator.

If this phase is successful then the communicator (2) downloads a client control program over the piconet link (4). The communicator device (2) then executes this program giving the user a full set of controls for rich interaction with the terminal display. This local user interface allows the user to exchange information with the server that is sensitive (for example personal or financial details) or otherwise not suitable for viewing on the large public display 14, for example audio information. For example, if a video file is presented on the display 14, and the communicator device supports a headset profile, the client processor 15 may use the piconet connection 4 to transmit a soundtrack associated with the video file. This is useful in situations where audio from the display cannot be heard directly (for example if it is behind a shop window).

2. Mid-End Interaction

In the second scenario the user is carrying a mobile phone style communicator (2) with a keypad and integrated piconet short-range radio technology (1). As in the previous scenario, when the user is in proximity of the terminal 10 the communicator 2 displays a message, plays an alert tone and/or vibrates to alert the user that interaction is possible, and if the user accepts this invitation to interact then the display (14) provides feedback to the user, denoting that an interactive session has begun. The user can control the on-screen menu system/cursor using the mobile phone keypad. The on screen menu indicates which keys should be pressed on the keypad of the handset 2 to access different services displayed on the screen 14—for example press key "2" to scroll a cursor up a list, "8" to scroll down, or "5" to select the item currently identified by the cursor. Audio from the terminal could be sent to the earpiece of the communicator device using the piconet 4 (via the headset profile).

If the system is configured with a Computer/telephony interface (CTI) unit (9) attached to the media server (7) then it is possible to have the system establish a telephone connection with the handset 2 through the telephone network 5, 8. This could be made available either to facilitate a voice channel (for voice control/access to the server 7) or to link to a call centre (90) to complete a transaction (credit card payment), to receive help or for billing purposes. Connection to the call centre could be an option on the menu list referred to above 3. Multiple User Interaction.

It is possible for several user terminals 2 to interact with the display 14 simultaneously. This can be used for interactions in a social group, for example for booking a holiday or playing games. The Bluetooth piconet system can link up to eight devices, so seven users that are standing in proximity to the display 14 can co-operate with the terminal 10 in one session. Alternatively, the terminal 10 could detect users in a queue and deal with each one in turn, but simultaneously accessing content from the server 7 in preparation for full interactions with the next few users. If later stages of an interaction over the piconet connection do not require the use of the display 14 (for example payment details entered using the user's handheld device 2) a subsequent member of the queue may start to be served before the interaction with the first is completed. Another application is a group gaming and gambling activity: for example all the users watching a race on the display 14, but placing individual bets using their communicators 2.

4. Low-End Interaction.

In this scenario the user has an RFID tag. Such tags are basic piconet interface units capable of transmitting an identification code but having no other communications or other user-operable capability. They are generally used merely to indicate the presence of the tag (and any device to which it is fitted), for example to prevent pilfering of goods. RFID technology has been used in the logistics and security applications for many years but it is gaining momentum as new radio frequencies are exploited [e.g. Hitachi's 2.45 GHz technology], new standards are agreed [e.g. ISO 15693] and cheap RFID tags are becoming available. They are used in applications such as security tagging in shops and libraries, for vehicle tolling, vehicle access (key fobs) and PC access. There are a number radio bands used worldwide in the UHF band [e.g. 433 MHz]. Such devices may use batteries but some short range types use battery-less active tags powered by the RF field itself. They are relatively cheap, have no shelf life problems and can thus be embedded safely in artifacts, infrastructure and living things. The first available battery-less tags [TIRIS from Texas Semiconductors] used a very low frequency of 134 kHz, but the more recent ISO15693 tags use a higher frequency of 13.56 MHz and have more intelligence within the microchips.

When a user having such a tag is in proximity to the terminal 10 (and its short-range radio interface 13) the tag transmits its unique identity code to the terminal 10 which forwards it to the server 7. The server responds with localised and personalised information for display on the display unit 14. Typically, since the user has no means of input to the display, he/she can only view content. A typical use in a retail setting would be to use RFID tags to replace customer loyalty cards. The customer could approach a display unit to check special offers/savings and the status of his/her account. Using RFID tags would also mean that the collection of loyalty points could be done passively at the checkout, the terminal 10 identifying the account to which the points are to be credited from the RFID tag identity. By providing multiple RFID tag reading piconet interfaces 13 all serving the same client processor 15, it is possible to determine the route being taken by the user, for example to identify whether the user is approaching or leaving the area where the display 14 can be seen.

Instead of transmitting audio signals to the user's device, it may instead be used to track the movement of the user so that a highly directional acoustic signal can be sent from a loudspeaker to the user, using the "Audio Spotlight" technology developed by the MIT Media Lab, which produces sound in a very narrow beam that can be treated similarly to a beam of light, being able to be focussed, reflected and directed as necessary. Using the invention it would be possible to ensure a relatively private 'hotspot' of sound that could be steered to provide the user with an unobtrusive audio feed as he moves within the area of coverage.

The invention claimed is:

1. An interactive information delivery terminal comprising:
   an information display unit;
   retrieval means for generating control commands for transmission to an information store over a first communications link and for retrieval of information therefrom;
   a user interface for receiving control commands over a second communications link for controlling the retrieval means, the user interface having means for recognizing the presence of a user device and establishing a connection with the user device using the second communications link and means for generating an alert to indicate to a user that the connection has been established, said alert being displayed on an output display unit of the user device; and
   means for determining capabilities of the user device using the second communications link and for thereafter selectively transmitting information to the user device retrieved from the information store in dependence on the determined capabilities.

2. A terminal as in claim 1 wherein information retrieved from the information store comprises information suitable for public display and not suitable for public display, the terminal being adapted to display the information suitable for public display on the information display unit and to transmit the information not suitable for public display to the user device.

3. A terminal as in claim 1 wherein an alert signal is transmitted to the user device using the second communications link.

4. A terminal as in claim 1 having means for transmitting display data over the second communications link.

5. A terminal as in claim 1 having means for interaction with a plurality of user devices simultaneously.

6. A method of operating an interactive information delivery terminal comprising an information display unit and retrieval means, said method comprising:
   generating control commands by retrieval means for transmission to an information store over a first communications link for retrieval of information therefrom, the control commands from the retrieval means to the information store being activated in response to control commands received from a user device over a second communications link for controlling the retrieval means;
   recognizing the presence of a user device and establishing a connection with the user device using the second communications link and generating at the user interface an alert to indicate that the connection has been established, wherein the alert is displayed on an output display unit of the user device; and determining capabilities of the user device using the second communications link and thereafter selectively transmitting to the user device information retrieved from the information store in dependence on the determined capabilities.

7. A method as in claim 6 wherein an alert signal is transmitted to the user device using the second communications link.

8. A method as in claim 6 wherein display data is transmitted over the second communications link.

9. A method as in claim 6 wherein the terminal is capable of interacting with a plurality of user devices simultaneously.

10. A method as in claim 6 wherein information retrieved from the information store comprises information suitable for public display and not suitable for public display, the terminal being adapted to display the information suitable for public display on the information display unit and to transmit the information not suitable for public display to the user device.

* * * * *